United States Patent [19]

Wood et al.

[11] Patent Number: 5,197,817
[45] Date of Patent: Mar. 30, 1993

[54] QUICK ACTING GIMBAL JOINT

[75] Inventors: William B. Wood, League City; Gary D. Krch, Friendswood, both of Tex.

[73] Assignee: The United States of America as represented by the Administrator of the National Aeronautics and Space Administration, Washington, D.C.

[21] Appl. No.: 899,536

[22] Filed: Jun. 16, 1992

[51] Int. Cl.$^5$ .............................................. F16C 11/00
[52] U.S. Cl. ........................................ 403/93; 403/97; 403/84; 403/324
[58] Field of Search .................... 403/88, 84, 94, 97, 403/101, 324, 93

[56] References Cited

U.S. PATENT DOCUMENTS

| | | | |
|---|---|---|---|
| 437,650 | 9/1890 | Huntington | 403/97 |
| 2,763,517 | 9/1956 | Strand | 403/97 X |
| 4,037,488 | 7/1977 | Laney, Sr. | 74/548 |
| 4,105,347 | 8/1978 | Gossage | 403/324 X |
| 4,447,170 | 5/1984 | Holmes | 403/64 |
| 4,547,092 | 10/1985 | Vetter et al. | 403/59 |
| 4,592,526 | 6/1986 | Kobelt | 248/278 |
| 4,620,813 | 11/1986 | Lacher | 403/93 |
| 4,688,817 | 8/1987 | Marier | 280/278 |
| 4,731,896 | 3/1988 | Latour | 403/97 X |
| 4,929,113 | 5/1990 | Sheu | 403/84 X |
| 5,123,768 | 6/1992 | Franklin | 403/84 X |

FOREIGN PATENT DOCUMENTS 911129 6/1946 France ................................ 403/84

Primary Examiner—Andrew V. Kundrat
Attorney, Agent, or Firm—Hardie R. Barr; Guy M. Miller; Edward K. Fein

[57] ABSTRACT

An improved linkage assembly (10) provides for locking the pivotable position of one member (12) relative to another member (14). The linkage assembly permits the unlocking of these members, their subsequent repositioning, and the reliable relocking in a desired position without utilizing tooling. The first member (12) includes a pair of spaced apart support flanges (24,26) each having a through aperture (28) therein defining a flange female spline (29). The second member (14) has an end (42) positioned between the pair of support flanges (24,26) and also includes a through aperture (46) defining a pair of second member female splines (47). A pair of control members (84,86) are each slidably moveable along the common axis (32) and extend through the respective flanges (24,26). Each control member (84,86) has a male splined portion (66) which normally engages both the respective flange female spline and the second member female spline to lock the rotatable position of the first and second members. When each of the control members (31) are pressed inward simultaneously, the male splined portions disengage the flange female splines to permit rotation of the first member about the common axis with respect to the second member.

16 Claims, 1 Drawing Sheet

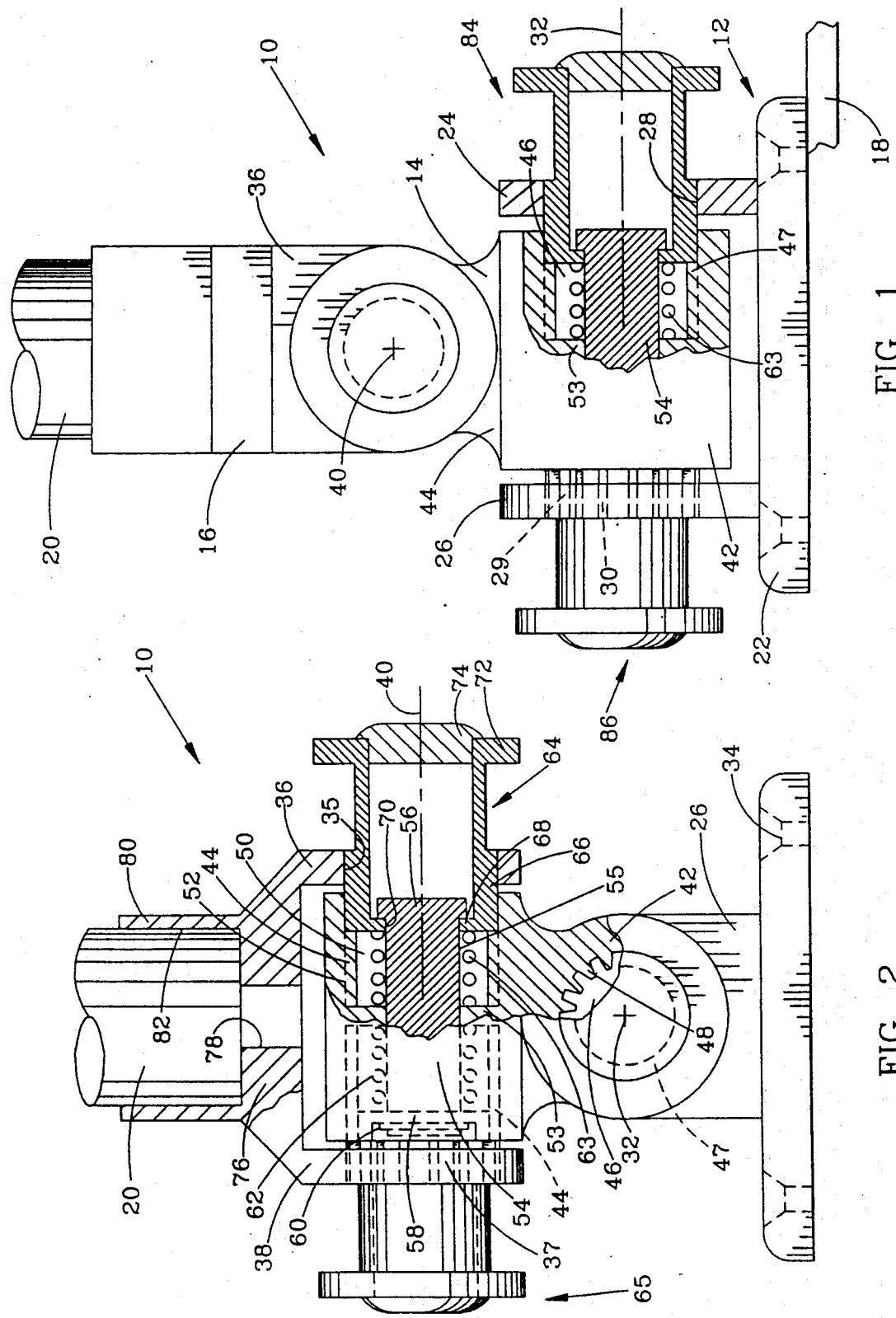

QUICK ACTING GIMBAL JOINT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

The present invention relates to an adjustable linkage assembly for selectively retaining the position of one member pivotable with respect to another member. More specifically, the invention relates to a linkage assembly commonly referred to as a gimbal joint, and particularly to a quick release or quick acting gimbal joint which may be easily and reliably controlled.

BACKGROUND OF THE INVENTION

Adjustable linkage assemblies have been used for centuries to secure the position of one member pivotable with respect to another member. Such linkage assemblies allow selected rotation of one member with respect to another about an axis and, when the desired relative position of the members is obtained, enable the members to be locked in place. One of the earliest of such linkage assemblies utilizes a conventional bolt and nut mechanism, with the bolt passing through an aperture in each of the first and second members. When the desired position of the members is obtained, the nut is torqued to lock the members in their desired position. A variation of this concept is disclosed in U.S. Pat. No. 4,592,526, wherein the mating members include interlocking spline-type gears to securely lock the relative position of the members in place once the desired rotational orientation has been achieved.

A significant disadvantage of the linkage assembly disclosed in the above patent is that hand tools are required to unlock and relock the position of the members. In many applications, a linkage assembly is intended to be quickly unset, moved, and reset. In other cases, the linkage assembly preferably is controlled by various inexperienced personnel, yet must be reliably reset. In all such cases, linkage assemblies ideally do not require tooling to unlock and lock the position of one member relative to another.

U.S. Pat. No. 4,688,817 discloses a mechanism for adjusting the position of a steering handlebar with respect to a column. A lever is provided for actuating cams to lock the members in a desired position. The disclosed mechanism is complex, and in many situations sufficient space is not available for achieving the required movement of the lever. A similarly complex, lever controlled mechanism for facilitating rotation of a machine shaft is disclosed in U.S. Pat. No. 4,037,488.

Numerous other mechanisms have been designed which allow pivotable rotation of one member relative to another, while enabling the members to be selectively locked in position without tooling. U.S. Pat. No. 4,547,092 teaches a clamp with mating gear-like members which rotate relative to one another. A support rod may be connected to one of the members, and a threaded bolt with a knob head used to lock the gear-like members in their desired rotational orientation when the support rod is in its desired position. A relatively simple position retaining mechanism is disclosed in U.S. Pat. No. 4,620,813. Duel toothed arcs are hinged together in opposition, and are maintained in position by a biasing spring, with each of the arcs being adapted for mating engagement with corresponding teeth on the exterior surface of a shaft. In operation, the handles of the two arcs are pressed together against the spring bias force to cause separation and allow decoupling and rotation of one member relative to another. Thereafter, the handles are released and the toothed arcs again mated to the shaft to lock the position of the members in place. An articulated linkage system is disclosed in U.S. Pat. No. 4,447,170. This mechanism includes L-shaped brackets, each having a spring loaded release mechanism. A button may be actuated to allow rotation of one bracket relative to another, and thereafter released to lock the position of the brackets in place.

The above mechanisms have one or more disadvantages which have induced the redesign of a gimbal joint according to the present invention. As previously noted, many such linkage mechanisms are large or require a great deal of space for operation, and according cannot be used in compact assemblies or in locations where space is a premium. Some device are comparatively complex and thus costly, while other devices are simple but lack the desired strength to lock the members in their desired position. Most prior art devices either require special tooling, or can be inadvertently actuated to allow movement of one member relative to another when not intended, thereby creating a safety risk.

A further disadvantage of many prior art adjustable linkage assemblies is that the torque which may be transmitted through the locked linkage assembly and between the first and second members depends on operator discretion, thereby reducing reliability. In other linkage designs, forces are not uniformly transmitted between assembly components, so that the interlocking components must be oversized. Other linkage assemblies are not easily utilized by increasingly popular robotically controlled arms. Improved linkage assemblies are required, for example, in outer space applications where near-zero gravity conditions create additional manipulation problems when such linkage assemblies are operated by either personnel or computer controlled equipment.

The disadvantages of the prior art are overcome by the present invention. An improved linkage assembly is hereinafter disclosed for selectively retaining the position of one member rotatable about an axis with respect to another member. The linkage assembly of this invention is relatively simple in construction, compact, and has superior locking strength. A gimbal joint of the present invention may be quickly and easily used without special tooling by inexperienced personnel or computer controlled equipment, and is designed to prevent inadvertent actuation.

SUMMARY OF THE INVENTION

The improved linkage assembly of the present invention has utility in numerous applications wherein one desires a mechanism to lock in place the pivotable position of one member relative to another, while allowing the unlocking of these members, their repositioning to a newly selected orientation, and the reliable re-locking of the members in the newly selected orientation. The linkage mechanism of this invention is compact, relatively inexpensive, and achieves high locking strength which desirably is not dependent upon operator discretion. The linkage mechanism has high reliability, is designed to minimize inadvertent unlocking, and requires no additional tooling.

In one embodiment of the invention, the linkage mechanism comprises a base member, a pivot member and an adaptor. The pivot member is selectively allowed to rotate about a first axis relative to the base, and the adaptor is similarly allowed to rotate with respect to the pivot member about a second axis perpendicular to the first axis. Accordingly, a device secured to the adaptor may be selectively moved in any position within two planes of freedom relative to the base, and the device then secured in its desired position. A linkage mechanism offering this capability is commonly referred to as a gimbal joint.

Each of the base member and adaptor include a pair of spaced apart support flanges having through apertures therein defining a flange female spline. Each pair of flange female spines is preferably formed about a common axis. The pivot member has opposing ends each positioned between the respective flanges, and each end has a through aperture oriented 90 degrees relative to the aperture in the other end of the pivot member. Each pivot member through aperture is positioned in alignment with the pair of respective flange apertures, and also includes a pivot member female spline at each end of the aperture and adjacent a respective flange female spline. A retaining pin is provided within each pivot member through aperture, and a control member or button extends through each respective flange aperture and is slidably movable along the common axis relative to the pivot member and the respective flange. Each control member has an inward end with a male spline, and an outward end with a cap for engagement by an operator or suitable machine arm. The male spline of each control member is normally in mating engagement with both the respective flange female spline and the female spline in the respective end of the through aperture in the pivot member, thereby rotatably locking the position of the base member relative to the pivot member. The opposing buttons provide redundant locking, and uniformly transmit locking forces between the base member and the pivot member, which may generally be referred to as respective first and second members. Similar control members lock the position of the pivot member relative to the adaptor or third member.

To unlock one member relative to the other and permit rotation about the respective axis, the opposing control members may simultaneously be pressed inwardly toward each other, thereby compressing a spring and moving each of the male splines out of the engagement with each of the flange female splines. Each of the pair of control members or buttons may be simultaneously actuated by one hand of an operator, while the other hand may be used to selectively pivot one member relative to the other. When the desired orientation of these members is obtained, the buttons may be released, thereby allowing the biasing spring to return each of the buttons to its outward position such that the male spline of each button is again in mating engagement with both the pivot member and a respective support flange. Forces are transmitted through the pair of opposing buttons when in the locked position, and inadvertent bumping of one button cannot release the locked position of the members.

Since the mating engagement of splines locks one member to the other in a desired position, operator discretion with respect to the necessary locking strength is desirable not required. This feature allows the linkage assembly to be reliably rated at a predetermined strength. As noted above, redundant locking is provided by opposing buttons, thereby achieving more uniform stress loading. The linkage assembly is compact, and minimal pace is required for its operation. The mechanism utilizes opposing forces to cause unlocking, and is well suited for numerous application, including near-zero gravity environments.

It is an object of the present invention to provide an improved linkage assembly which does not require tooling for operation, yet achieves high safety by substantially minimizing inadvertent actuation, and does not utilize operator discretion to obtain the desired locking strength between members.

It is a feature of this invention that the linkage assembly is compact and relatively inexpensive. The mechanism may be utilized in numerous applications, including applications where space for manipulation is minimal, and near-zero gravity environments.

An advantage of the invention is that the mechanism may be reliably utilized by inexperienced personnel to quickly unlock the position of one member relative to another, reposition the members as desired, and then relock the members in their desired position.

These and further objects, features, and advantages of the present invention will become apparent from a following detailed description, wherein reference is made to the figures in the accompanying drawings.

DETAILED DESCRIPTION OF THE DRAWINGS

FIG. 1 is a front elevation view, partially in cross section, of a gimbal joint according to the present invention.

FIG. 2 is a side elevation view, partially in cross section, of the gimbal joint shown in FIG. 1.

DETAILED DESCRIPTION OF PREFERRED EMBODIMENTS

FIG. 1 and 2 depict one embodiment of a linkage assembly according the present invention. The linkage assembly has utility in countless applications wherein one desires to temporarily fix the pivotable position of one member relative to another. In a typical application, the first member may be fixedly mounted to a stationary object, and the second member is pivotable with respect to the first member and thus the stationary object. The linkage assembly may be unlocked, the second member rotated with respect to the stationary object until the selected position or orientation of the second member is obtained, and the linkage assembly then locked with the second member in its desired position. Any number of different components, such as a rod, may be secured to the second member, so that the position of the rod is thus selectively adjustable with respect to the stationary object.

The above described linkage assembly involves selective rotation of the second member about an axis with respect to the first member, i.e., rotation of the second member is possible within a plane perpendicular to a first axis of rotation. Increased flexibility is provided according to the present invention by providing a third member pivotable about a second axis with respect to the second member, so that the third member may rotate in any plane perpendicular to the second axis. The second axis is preferably perpendicular to the first axis, so that selective position of the second and third members permits orientation of the third member within any angular direction with respect to the first member and thus the stationary object. This latter embodiment is commonly referred to as a gimbal joint. If desired, additional components may be provided to permit further adjustment of the rod or other component to be positioned. A number of different commercially available devices could be installed, for example, between the third member and the object whose position is selectively adjustable, to permit the spacing between the third member and the object to be adjusted. In this embodiment, both the angular position and the spacing between the stationery member and the object to be adjusted is thus possible. Also, it should be understood that when the position of a second member is selectively adjusted with respect to a first member, the position of the first member is inherently selectively adjusted with respect to the second member. The terms first, second, and third members, as used hereafter, are thus intended only to distinguish one member pivotable with respect to another member. While the first member is discussed below as the base member, either the first or second member, or the first and third member for the gimbal joint embodiment, may be secured to a base which is stationary relative to the movable member.

FIG. 1 depicts a linkage assembly 10 comprising a first base member 12, a second pivot member 14, and a third adaptor member 16. The base member 12 may be secured to a stationary object, such as plate 18. Any number of different components, such as rod 20, may be secured to member 16. The second member 14 is pivotable about axis 32 with respect to member 12, and member 16 is pivotable about axis 40 with respect to member 14, so that the angular orientation of rod 20 may be fixed in any desired direction with respect to plate 18.

Base member 12 includes a base flange 22 for fixed engagement with plate 18, and a pair of spaced apart flanges 24, 26 each extending upward from base flange 22. The base flange 22 may be provided with a plurality of holes 34 for receiving conventional bolts or screws. Each support flange 24, 26 has a through aperture 28 therein defining a flange female spline 29 formed by a plurality of circumferentially spaced teeth 30. Each flange through aperture 28 is preferably formed about the common axis 32, although the device 10 would be functional if the axis of the flange through apertures were not aligned. As explained below, while the flange female spline embodiment is preferred, various mechanisms other than teeth could be used to form a female locking surface on each flange 24, 26.

The second pivot member 14 has a lower end 42 positioned between the pair of support flanges 24, 26, and an opposing upper end 44. The end 42 includes a second member through aperture 46 therein (see FIG. 1 and 2). A second member female spline 47 is provided adjacent each end of the aperture 46, and is formed by a plurality of circumferentially arranged teeth 48. The configuration and spacing of teeth 30 corresponds to the teeth 48, so that the profile of each flange female spline 29 corresponds to the profile of the respective adjacent second member female spline 47. The female splines 47 at the end of the through aperture 46 are also preferably identical, as are the spaced apart flange female splines. As explained subsequently, the second or pivot member 14 is rotatable about axis 32 with respect to base member 12, so that this second member 14 is rotatable within a plane perpendicular the drawing sheet as shown in FIG. 1, and is rotatable about axis 32 to the right or to the left within the plane of the drawing sheet as shown in FIG. 2.

FIG. 2 depicts more clearly the structure of the third member or adaptor 16 generally shown on FIG. 1. The third member 16 is similar to the first member 12 in that a pair of spaced apart flanges 36 and 38 are provided, with each flange having an aperture 35 therein forming a flange female spline 37 composed of a plurality of teeth. The flange apertures 35 in the member 16 are preferably formed about a common central axis 40, just as the apertures 28 in the flanges 24 and 26 of the first member are formed about the common central axis 32. The upper end 76 of the third member 16 is provided with a bore 78 which may serve as a convenient means of attaching or securing an item to the third member. Such an item may be, for example, a bolt-like end of a rod similar to rod 20. In addition, the third member 16 may include a sleeve-shaped upper portion 80 having threaded or spline sidewalls 82 for similarly serving as an attachment mechanism for removeably securing any number of different devices thereto, such as rod 20.

Referring to FIG. 1 and 2, both the lower end 42 and the opposing upper end 44 of the second or pivot member are provided with respect through apertures 46 and 50. Each through aperture is formed about a respective central axis coincident with axis 32, 40, respectively, and these axes are preferably normal or perpendicular to one another. The structure defining each aperture 46, 50 may otherwise by identical, so that a full description of the upper aperture 50 which follows may also serve as a description of the lower aperture 46. The aperture 50 is preferably symmetrical about axis 40, and defines a second pivot member female spline 4 adjacent each end of the aperture. Each female spline 44 is formed by plurality of circumferentially arranged teeth 42, and each female spline 44 is substantially identical to the adjacent flange female spline 37.

The upper end of the member 14 also includes a center support member 53 which provides a restricted or reduced diameter portion for the through aperture 50. In effect, the support member 53 forms the intermediate wall within the through aperture, with the wall having a cylindrical bore therein. A retaining pin 54 is provided within the through aperture 50 and passes through and is supported by the support member 53. Pin 54 in turn, has a cylindrical outer surface 55 which serves as a guide for sliding engagement with the control members discussed subsequently. A head 56 is provided at one end of the pin 54, while snap ring 60 may be fitted within a groove in the opposite end of the pin to serve as a stop. A pair of coil springs 62, 63 are each slipped over the pin 54 and engage the support member 53 to bias the control members outwardly. The lower through aperture 46 has a similar support member 53, pin 54, and springs 62, 63.

The control members for unlocking the secured position of one member relative to another will now be described. Each of the members are slidably within its respective pivot member through aperture 46, 50. Control member 64 depicted in FIG. 2 passes through the female spline in flange 36 and extends outwardly from the flange. An outer end plate 72 is provided with button head 74, and plate 72 may serve as a stop to limit inward movement of the button head by engaging the flange 36. The inner end of the button 64 includes a male spline portion 66 comprising a plurality of circumferentially arranged teeth. The male spline portion 66 is adapted for mating engagement for both the female spline 37 in the flange 36, and with the female spline 44 within the member second formed at the end of the aperture 50 adjacent flange 36. An inward end of the control member includes a plate 68 having a cylindrical bore therethrough defining a surface 70 for sliding engagement with the surface 55 on the pin. Accordingly, it should be understood that the pin 54 guides the button 64 as is moved inward with respect to the flange 36, and during this sliding movement the male spline 66 remains in sliding engagement with the female spline 44, and may disengage from the female spline 37 on the flange 36. The opposing button 65 is identical to button 64, and button 65 has a similar male spline portion which engages the female spline on both the flange 38 and the female spline at the opposing end of the through aperture 50. The end plate 58 of the opposing button 65 is pressed into engagement with the snap ring 60 by the spring 62. Buttons 84 and 86 as shown in FIG. 1 may be identical to those described above, and form the same function with respect to the female splines in the supporting plates 24 and 26, and with the females splines 47 at each end of the through aperture 46 in the lower portion 42 of the pivot member 14.

The technique for assembling the buttons, springs, and retaining pins will now be described, with particular reference made tot he buttons 64, 65 as shown in FIG. 2. With the button cap 74 of each button removed, the pin 56 may be passed through one of the buttons so that the pin head 56 engages the end plate 68. Spring 63 may then be installed over the pin, and this assembly fitted into the position substantially as shown in FIG. 2 by mating the male spline portion 66 with both the female spline portions 35 on the flange 36 and with the adjacent female spline 44 on the pivot member 14. The similar coil spring 62 can then be passed through the aperture in the flange 38 and installed over the opposing end of the pin 54, and spring 62 slightly compressed by the end plate 58 of the button 65 (which has its cap removed). To properly position the button 65, its male spline portion will simultaneously mate with both the female spline portion of the flange 38 and with the female spline portion 44 at the opposing end of the through passageway 50. With the coil spring 62 slightly compressed, the snap ring 60 may then be fixed to the end of the pin utilizing a conventional tool inserted through the opening in the outward end of the button 65. With the buttons properly positioned, the end caps 74 may be fitted in place on the flange 72 of each respective button.

The method of operating the gimbal joint 10 will be suggested from the above disclosure. For purposes of explanation, one may assume that the base flange 22 has been secured by conventional techniques to a fixed plate 18, and that a rod or similar member whose position is selectively adjustable with respect to the plate 18 has been attached to the third member 16. To move the rod 20 in any desired direction within the plane of the sheet as shown in FIG. 2, the buttons 84 and 86 may be simultaneously compressed with one hand of an operator, while the other hand grasps and rotates the rod 20 to be positioned. By compressing each of the buttons 84 and 86 inwardly, each of the male spline portions will disengage the respective female spline within the flanges 24 and 26, so that rotation of the rod within the plane of the sheet of FIG. 2 is possible. With the rod 20 in its desired position, the buttons 84, 86 may be released, and the coil springs will automatically return each of the buttons outward, so that the male spline portion of each button reengages both the female spline of the respective flange 24, 26. The male splines thus lock the pivot member to the pair of flanges when in their outward position, and are released from the flanges when pressed inward. To facilitate mating re-engagement of the male spline portion with the female spline portion on each flange, the ends of one or both spline portions may be angled or tapered. Assuming one desires to next reposition the rod 20 within a plane defined by the sheet at shown in FIG. 1, the buttons 64 and 65 may be simultaneously compressed, so that the third member 16 and thus the rod 20 may pivot about the axis 40.

It should be apparent from the foregoing disclosure that the adjustable linkage assembly of the present invention is compact, and does not require much space for operation. The device is relatively simple, but offers a comparatively high locking strength. Operator discretion is not involved in determining how securely one member is locked relative to another, so that the device may have a high safety rating. Because of the redundancy provided by opposing buttons, it may be seen that inadvertent bumping of one button will not allow the release of the locked position of one member relative to another.

Since release of the linkage assembly occurs by simultaneously compressing opposing buttons, it may be seen that linkage assembly is well suited for being controlled by an arm of robotic equipment. The mechanism may be reliably used, for example, in outer space applications with little regard for the forces necessary to oppose the compression of the opposing button. In other words, neither a human nor robot arm acting to simultaneously compress the buttons 64 and 65 as shown in FIG. 2 need be restrained by a substantial force, since the compression forces acting on the buttons effectively cancel each other.

To minimize operational problems, it is preferable that the central axis for each of the opposing flange apertures be aligned, so that the opposing apertures effectively have a common central axis. The linkage assembly has a utility, however, in applications where the opposing apertures are either inclined relative to one another, or are offset from each other. Simultaneous compression of the opposing buttons passing through these apertures may then result in some additional forces being transmitted to the members, but these forces may be relatively minor. Primary advantages of keeping the opposing flange apertures aligned, as shown in the figures, are reduced manufacturing costs and ease of operation.

Variations of the male and female splines used to lock the position of one member relative to another are also possible, although the embodiments discussed above and shown in the figures has a relatively low manufacturing cost and preferably allows for short incremental positioning of the members. The incremental angular change possible with the male and female spline design thus depends on the number of teeth provided on the mating spline portions, which is primarily a function of manufacturing cost. Various other locking surface designs and configurations are possible and within the scope of this invention. For example, the inward end of each button may be provided with a hexagonal configuration, and the aperture in each of the respective flanges and each end of the adjacent passageways 46, 50 may be provided with mating female locking surfaces having a hexagonal configuration. While this design would only allow angular incremental changes of 60 degrees between locked positions, this comparatively large incremental change may be sufficient for some applications. Similar modifications will be apparent from the foregoing disclosure.

These and other changes and modifications to the linkage assembly should now be apparent to those skilled in the art. As previously indicated, the linkage assembly of the present invention allows selective movement and repositioning of one member relative to another within a plane perpendicular to the axis of rotation between these members, and increased complexity for the linkage assembly may be provided by the addition of a third member or additional members each rotatable with respect to another member. These and further changes and modifications are within the scope of the invention, which is intended to be limited only by the following claims.

What is claimed is:

1. An adjustable linkage assembly for selectively retaining the position of a first member rotatable about an axis with respect to a second member, the assembly comprising:

the first member including a pair of spaced apart support flanges each having a flange through aperture therein defining a flange female spline;

the second member having a pivot end positioned between the pair of support flanges and an opposing end extending from the first member, the pivot end including a second member through aperture therein defining a pair of second member female splines each adjacent a respective end of the second member through aperture, the second member being rotatable about an axis with respect to the first member;

a pair of control members each slidably moveable within the second member through aperture and each extending through a respective flange through aperture, each control member having a male splined portion and an outer end extending outward from a respective one of the first member support flanges;

each of the pair of control members normally having its male splined portion in mating engagement both with a respective one of the pair of flange female splines and with a respective one of the pair of second member female splines to lock the rotatable position of the first member with respect to the second member, and each of the pair of control members being slidably moveable inward such that the male spline disengages the respective flange female spline to permit rotation of the first member about the axis with respect to the second member;

a biasing member for biasing at least one of the pair of control members outwardly with respect to its respective first member support flanges; and a retaining pin positioned within the second member through aperture for guiding slidable movement of each of the pair of control members with respect to the second member, the second member having a center support for supporting the retaining pin within the second member through aperture; and the biasing member includes a pair of springs each acting between the center support and a respective one of the control members.

2. The adjustable linkage assembly as defined in claim 1, wherein one of the first and second members includes a base flange for securing the one member to a stationary object.

3. The adjustable linkage assembly as defined in claim 1, further comprising:

the second member opposing end including another through aperture therein defining another pair of second member female splines each adjacent a respective end of the another through aperture;

a third member including a pair of third member spaced apart support flanges each having a through aperture therein defining a third member flange female spline, the third member being rotatable about another axis with respect to the second member;

another pair of control members each slidably moveable within the second member another through aperture and each extending through a respective third member flange through aperture, each of the another control members having a male splined portion and an outer end extending outward from a respective one of the third member support flanges; and each of the another pair of control members normally having its male splined portion in mating engagement both with a respective one of the pair third member flange female splines and with a respective one of the another second member female splines to lock the rotatable position of the second member with respect to the third member, and being sildably moveable inward such that the male splined portion disengages the respective third member flange female spline to permit rotation of the third member about the another axis with respect to the second member.

4. The adjustable linkage assembly as defined in claim 3, further comprising:

the pair of first member flange apertures being formed about one common axis; and the pair of third member flange apertures being formed about another common axis substantially normal to the common one axis.

5. The adjustable linkage assembly as defined in claim 3, further comprising:

another biasing member for biasing each of the another pair of control members outwardly with respect to the respective third member support flange.

6. The adjustable linkage assembly as defined in claim 5, further comprising:

a retaining pin positioned within the second member another through aperture for guiding sliding movement for each of the pair of another control members with respect to the second member.

7. The adjustable linkage assembly as defined in claim 3, wherein the third member includes attachment means for securing a component to the third member.

8. An adjustable linkage assembly for selectively retaining the position of one member with respect to another member, the assembly comprising:

the one member including a first pair of spaced apart support flanges each having a flange through aperture therein defining a first flange female locking surface;

the another member including a second pair of spaced apart support flanges each having a flange through aperture therein defining a second flange female locking surface;

a pivot member having a first pivot end positioned between the first pair of support flanges and an opposing second pivot end positioned between the second pair of support flanges, the first pivot end including a first pivot member through aperture therein defining a first pair of pivot member female locking surfaces each adjacent a respective end of the first pivot member through aperture, the second pivot end including a second pivot member through aperture therein defining a second pair of female locking surfaces each adjacent a respective end of the second pivot member through aperture, the pivot member being rotatable about a first axis with respect to the first member, and the pivot member being rotatable about a second axis with respect to the second member;

a first pair and a second pair of control members, each pair of control members being slidably moveable within a respective one of the first and second pivot member through apertures;

each control member of the first pair and second pair of control members extending through a respective flange through aperture, and having a male locking portion and an outer end extending outward from a respective one of the support flanges, each control member normally having its male locking portion in mating engagement with a respective one of the flange female locking surfaces and with a respective one of pivot member female locking surfaces to lock the rotatable position of the first and second members with respect to the pivot member, and each of the control members being slidably moveable inward such that the male locking portion disengages the respective flange female locking surface to permit rotation of the respective first and second member about the respective first and second axis with respect to the pivot member.

9. The adjustable linkage assembly as defined in claim 8, further comprising:

first and second biasing members for biasing the first pair and the second pair of control members outwardly, respectively, with respect to the respective support flanges.

10. The adjustable linkage assembly as defined in claim 9, further comprising:

a first retaining pin position within the first pivot member through aperture for guiding slidable movement of each of the first pair of control members with respect to the pivot member; and a second retaining pin position within the second pivot member through aperture for guiding slidable movement of each of the second pair of control members with respect to the pivot member.

11. The adjustable linkage assembly as defined in claim 10, further comprising:

the pivot member having a first center support and a second center support for supporting the first retaining pin and the second retaining pin, respectively, within the first and second pivot member through apertures; and each of the first and second biasing members includes a pair of springs each acting between the respective first and second center support and a respective one of the control members.

12. The adjustable linkage assembly as defined in claim 8, further comprising:

the first pair of flange through apertures being formed about a first common axis; and the second pair of flange through apertures being formed about a second common axis;

the first pivot member through aperture having a first central axis aligned with the first common axis; and the second pivot member through aperture having a second central axis aligned with the second common axis.

13. The adjustable linkage assembly as defined in claim 8, further comprising:

each of the first flange female locking surfaces is defined by a first flange female spline;

each of the second flange female locking surfaces is defined by a second flange female spline;

each of the pivot member locking surfaces is a pivot member female spline;

the male locking portion of each control member includes a male spline for mating engagement with both a respective one of the first and second flanges female splines and with a respective pivot member female spline.

14. An adjustable linkage assembly for selectively retaining the position of a first member rotatable about an axis with respect to a second member, the assembly comprising:

the first member including a pair of spaced apart support flanges each having a flange through aperture therein defining a flange female locking surface, the pair of flange apertures being formed about a common axis;

the second member having a pivot end positioned between the pair of support flanges and an opposing end extending from the first member, the pivot end including a second member through aperture therein having a central axis aligned with the common axis, the second member through aperture defining a pair of second member female locking surfaces each adjacent a respective end of the second member through aperture, the second member being rotatable about an axis with respect to the first member;

a pair of control members each slidably moveable with the second member through aperture and each extending through a respective flange through aperture, each control member having a male locking portion and an outer end extending outward from a respective one of the first member support flanges;

a retaining pin positioned within the second member through aperture for guiding slidable movement of each of the pair of control members with respect to the second member; the second member having a center support for supporting the retaining pin within the second member through aperture;

each of the pair of control members normally having its male locking portion in mating engagement with a respective one of the pair of flange female locking surfaces and with a respective one of the pair of second member female locking surfaces to lock the rotatable position of the first member with respect to the second member, and each of the pair of control members being slidably moveable inward such that the male locking surface disengages the respective flange female locking surface to permit rotation of the first member about the common axis with respect to the second member; and a biasing member for biasing each of the pair of control members outwardly with respect to its respective first member support flange, the biasing member includes a pair of springs each acting between center support and a respective one of the control members.

15. The adjustable linkage assembly as defined in claim 14, wherein:
   each of the flange female locking surfaces is defined by a flange female spline;
   each of the second member female locking surfaces is defined by a second member female spline;
   the male locking portion of each control member includes a male spline for mating engagement with a respective flange female spline and with a respective second member female spline.

16. The adjustable linkage assembly as defined in claim 14, further comprising:
   the second member having an opposing end including another through aperture therein defining another pair of second member female locking surfaces each adjacent a respective end of the another through aperture;
   a third member including a pair of third member spaced apart support flanges each having a through aperture therein defining a third member flange female locking surface, the third member being rotatable about another axis with respective to the second member;
   another pair of control members each slidably moveable within the second member another through aperture and each extending through a respective third member flange through aperture, each of the another control members having a male locking portion and an outer end extending from a respective one of the third member support flanges; and
   each of the another pair of control members normally having its male locking portion in mating engagement both with a respective one of the pair of third member flange female locking surfaces and with a respective one of the another second member female locking surfaces to lock the rotatable position of the second member with respect to the third member, and being slidably moveable inward such that the male locking portion disengages the respective third member flange female locking surface to permit rotation of the third member about the another axis with respect to the second member.

* * * * *